United States Patent [19]

Hansen et al.

[11] 3,810,423

[45] May 14, 1974

[54] COLOR BAR PRINTER

[75] Inventors: Raymond J. Hansen, Centerville; Eila B. Spialter, Dayton; Robert M. Whitely, Dayton; Ning Wu, Dayton, all of Ohio

[73] Assignee: The National Cash Register Company, Dayton, Ohio

[22] Filed: July 31, 1972

[21] Appl. No.: 276,352

[52] U.S. Cl. ................ 101/93 C, 101/198, 101/211

[51] Int. Cl. ......... B41f 1/44, B41j 5/44, S41j 33/00

[58] Field of Search ........... 101/193, 196, 197–199, 101/211, 93 C; 340/146.3 B, 172.5; 235/61.11 E

[56] References Cited

UNITED STATES PATENTS

| | | | |
|---|---|---|---|
| 3,340,983 | 9/1967 | Halverson | 197/1 R |
| 3,678,465 | 7/1972 | Graham | 340/172.5 |
| 3,707,910 | 1/1973 | Combs | 101/93 C |
| 3,712,210 | 1/1973 | Landis | 101/93 C |

*Primary Examiner*—J. Reed Fisher

*Attorney, Agent, or Firm*—Richard W. Lavin; Wilbert Hawk, Jr.; J. T. Cavender

[57] ABSTRACT

There is described a printer used in printing a three color transition bar code. The printer overprints a single color on a preprinted medium having alternating bars of the second and third colors thereon. The printer includes a printing station, a detector to determine which preprinted color is then aligned with the printing station, and logic means to determine if the printing station should overprint the preprinted color.

11 Claims, 6 Drawing Figures

COLOR BAR PRINTER

This invention relates to a printer for printing a three color bar code, and more particularly to such a printer for printing only one color on a medium having alternating second and third colors preprinted thereon.

The prior art teaches a three color bar code in which transitions from a first color to a second color, from a second color to a third color and from the third color to the first color manifest a first binary value, and in which transition from the third color to the second color, the second color to the first color and the first color to the third color manifest a second binary value. This type of a code is described in U.S. Pat. application, Ser. No. 837,514 by John B. Christie, Dzintars Abuls and Wilfridus G. VanBreukelen and entitled "Transition Code Recognition System," and U.S. Pat. application, Ser. No. 837,850 by John B. Christie and entitled "Transition Code Recognition System," both assigned to the present assignee and both filed June 30, 1969. The advantage of a bar code using three colors is that it may contain much more information in a given space than similar bar codes using only two colors. However, one disadvantage of this three color coded system is that a printer capable of printing two different colors (the third color being the color of the medium itself) is required and this is expensive and creates difficult problems of alignment and registration. Examples of printers which print the color bar code are described in U.S. Pat. application, Ser. No. 51,071 by Ollah Combs, entitled "Optical Bar Code Serial Printer;" U.S. Pat. application, Ser. No. 51,073 by Donald E. Landis, entitled "Color Bar Printer;" U.S. Pat. application, Ser. No. 51,075 by Donald J. Girard entitled "Logic for Color Bar Printer;" and U.S. Pat. application, Ser. No. 51,149 by Richard E. Graham, entitled "Control Means for an Optical Bar Code Serial Printer," all of which were filed June 30, 1970, and assigned to the present assignee.

In each of the above mentioned color bar printer patent applications, a printer capable of printing two colors on a medium of the third color is described and each printer contains duplicate printing means, one for each color. It is desirable to provide a printer in which only one color need be printed. This may be accomplished by providing a tag medium having alternating bars of the first and second colors thereon and overprinting where necessary with the third color.

In accordance with one aspect of this invention there is provided a recorder responsive to a binary code for recording on a prepared medium a transition code manifesting said binary code. The transition code includes first, second and third characteristically different indicia in which transitions from a first to a second, from a second to a third and from a third to a first indicium represent one binary value and transitions from the third to the second, from the second to the first and from the first to the third indicium represent a second binary value. The medium is prerecorded with adjacent and alternating first and second indicia thereon. The recorder comprises means for recording the third indicium over one of the prerecorded first and second indicia in response to the occurrence of a record signal. The means for recording is aligned with the medium so that an entire one of the prerecorded first or second indicia is overrecorded upon the occurrence of said record signal. The recorder further includes means for providing a prerecorded indicia signal indicating which one of the first and second indicium is aligned with the means for recording and means for moving the medium in response to a move signal, the medium being moved the amount necessary to align the next adjacent prerecorded indicium with the means for printing. In addition, the recorder includes control means responsive to the binary signal and the indicium alignment signal for providing said record and move signals.

In accordance with a second aspect of this invention, there is provided a method of recording on a prerecorded medium a transition code which manifests a given binary code. The transition code has first, second and third characteristically different indicia in which transitions from a first to a second, from a second to a third and from a third to a first indicium manifest a first binary value, and transitions from the third to the second, from the second to the first and from the first to the third indicium manifest a second binary value. The prerecorded medium is prerecorded with adjacent and alternating first and second indicia. A given indicium on the prerecorded medium is aligned with the recording means in such a manner that the recording means can overrecord the given indicium with the third indicium. The method comprises the steps of determining whether the given prerecorded indicium is a first indicium or a second indicium, determining whether the indicium to be then recorded is a first indicium, a second indicium or a third indicium, and causing the recording means to overrecord the given indicium if the determined indicium to be recorded and the determined given prerecorded indicium are different.

One specific embodiment of this invention is hereinafter described in detail, with specific reference being made to the following FIGURES, in which.

Figures 1A, 1B, 2:
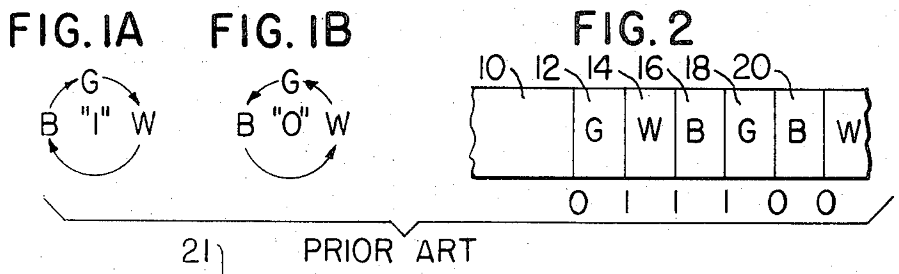
FIGS. 1A and 1B show code converting diagrams for converting between binary and color bar codes.
FIG. 2 shows a medium printed with the color bar code using the prior art printers.

A brief description of the color bar code will be given with reference being made to FIGS. 1A, 1B and 2. The color bar code is a transition code in which binary information is manifested by transition from one color to another color rather than having the particular color of a bar or the particular width of a bar manifest any information. It has been found that the colors black, green and white work well in a three color code although no special significance should be placed in the choice of these colors as far as this invention is concerned. Assuming the black, green and white colors are used, FIG. 1A indicates that transition from black (B) to green (G), green to white (W) and white to black are binary "1" values, and FIG. 1B indicates that transition from black to white, white to green and green to black manifests binary "0" value. In FIG. 2 an example of an encoded color bar field is shown. It is seen that a large white area 10 preceeds a series of constant width bars 12, 14, 16, 18 and 20, with bars 12 and 18 being labeled G for green, bar 14 being labeled W for white and bars 16 and 20 being labeled B for black. A particular sequence of area 10 and bars 12, 14, 16, 18 and 20 represent the binary code 011100 as indicated by the numbers "1" and "0" being aligned beneath the transition in FIG. 2. It should be noted that the particular width of bars 12, 14, 16, 18 or 20 is immaterial to the code manifested thereby. This of course is because the code is a transition code. The best bit density can be obtained by making each bar the same width, that width being the minimum allowed under the given tolerance of the reader. However, as previously mentioned, in order to effect this it becomes necessary to provide a printer with the capability of printing two different colors.

Figure 3:
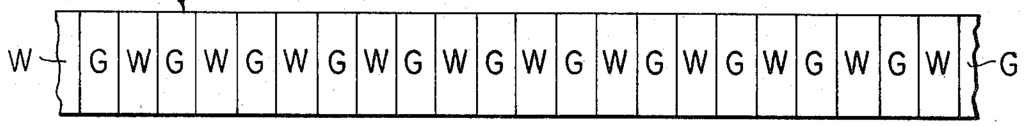
FIG. 3 shows the prerecorded medium used with the printer of this invention.

In circumstances when density is not such a critical factor, a preprinted medium 21 as shown in FIG. 3 may be used with a single station printer, and an occasional double width black bar will be printed thereon. Medium 21 is preprinted with alternating green and white bars with the green bars being indicated by the letter G and the white bars being indicated by the letter W. Green and white are chosen to be the preprinted colors because of the special color character necessary for the green color and because a black bar may be printed over either a green or a white bar much more easily than a green or a white bar can be printed over a black bar. The preprinted medium 21 may be printed by many known techniques, such as, for instance, offset printing.

Figures 4, 5:
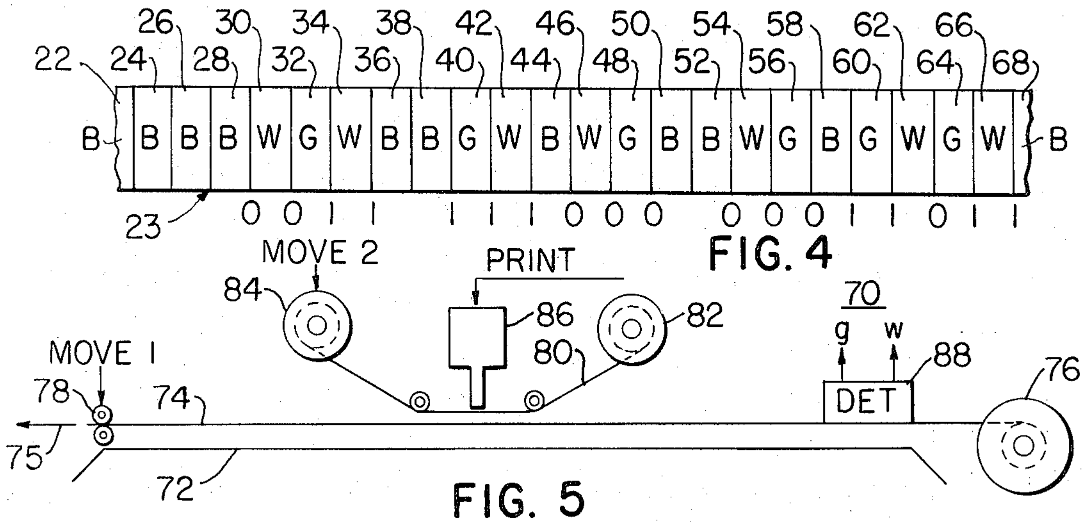
FIG. 4 shows a medium printed with the color bar code in accordance with this invention.
FIG. 5 shows a simple diagram of a printer for printing on the preprinted medium in accordance with this invention.

Referring now to FIG. 4, a tag 23 having a coded field printed according to the technique of this invention is shown. It should be noted that the bars of FIG. 4 are aligned with the bars of FIG. 3 in such a manner that a particular bar of FIG. 4 is beneath a corresponding bar in FIG. 3, with the bar in FIG. 3 being the original color of the preprinted bar in FIG. 4. The tag 23 is initially printed with a plurality of black bars 22, 24, 26 and 28 to indicate the beginning of the coded field. Similarly a series of adjacent black bars (not shown) will be printed at the end of the field. If an arbitrary code to be printed of 001111100000011011 is assumed, the color scheme beginning with the black bars 22, 24, 26 and 28 derived from the code converting diagrams of FIGS. 1A and 1B, is B, W, G, W, B, G, W, B, W, G, B, W, G, B, G, W, G, W, B. The first color, black, is the black bars 22, 24, 26 and 28. From FIG. 3, it is seen that a preprinted white bar 30 is present after bar 28, and since the second color desired is white, no overprinting of bar 30 occurs. The next two desired colors are green and white respectively and, again from FIG. 3, it is seen that bars 32 and 34 initially were preprinted green and white respectively; thus no overprinting occurs. Then a black color is desired and since bar 36 originally was preprinted green, it is overprinted by the printer to form a black bar 36. The next desired color is green; however bar 38 initially was preprinted white, so therefore bar 38 is overprinted with black to form double black bars 26 and 38. This causes the next bar to be green, as indicated by bar 40 and this is the desired color so no overprinting of bar 40 occurs. It should be noted that there is no color transition between bars 36 and 38 and a reader will treat this as a single bar.

The next color desired is white, which is the color of bar 42; thus no overprinting occurs for this bar. A black bar is then desired, so bar 44 is overprinted with black. This same procedure continues for bars 46 through 68 (even numbers only).

From the above example the following three rules of printing on the preprinted medium are seen:

1. where the desired color and the preprinted color are the same, do not print and go to the next adjacent preprinted bar;
2. where the desired color is black, overprint the preprinted color with black and go to the next adjacent preprinted bar; and
3. where the desired color is not black and the desired color and the preprinted color are different, overprint the preprinted color with black and go to the next alternate preprinted bar.

Referring now to FIG. 5, a simple diagram of a printer 70 is shown. Printer 70 includes a rigid area 72 over which the preprinted medium 74, shown in FIG. 3, is moved. The preprinted medium 74 is moved over rigid area 72, in a direction indicated by the arrow 75, from a supply wheel 76 containing the preprinted medium 74. The movement of the preprinted medium 74 is controlled by moving means 78 which may be any means which, upon command of a MOVE1 signal, will move medium 74 a distance equal to the width of one bar, such as a pair of rollers controlled by a stepping motor and appropriate gearing. An example of such moving means is shown in the above mentioned Combs patent application, Ser. No. 51,071.

Placed above medium 74 is an inked transfer ribbon 80 which has black ink on the side thereof next to medium 74 prior to the occurrence of a print operation. Ribbon 80 is supplied from a ribbon supply reel 82 and used ribbon is taken up on a ribbon take-up wheel 84. Each time a print occurs, ribbon take-up reel 84 responds to a MOVE2 signal by turning an amount sufficient to move ribbon 80 at least the width of one of the color bars. Printer 70 also includes a print station 86 which may be any conventional printing means such as the one shown in the above mentioned Combs patent application, Ser. No. 51,071. In response to a PRINT signal, printing station 86 causes ribbon 80 to make contact with the medium 74 to thereby cause the ink from the ribbon 80 to be transferred to the medium 74.

Printer 70 also includes a detector 88 for aligning medium 74 with respect to print station 86 so that a whole preprinted bar is directly beneath print station 86. Further, detector 88 detects the color of the preprinted bar aligned with print station 86 and provides a logic "1" w signal when a preprinted white bar is so aligned and a logic "1" *g* signal when a preprinted green bar is so aligned. Detector 88 may include a color bar reader which may be positioned a precise incremental number of bar widths from printing station 86. Detector 88 may further include a shift register buffer having a number of stages equal to the number of bar widths between the reader and printing station 86, to insure the detected signal is provided at the proper time. Also, detector 88 may be aligned directly behind or in front of printing station 86. A color bar reader is described in the above mentioned Christie et al. patent application, Ser. No. 837,514.

Figure 6:
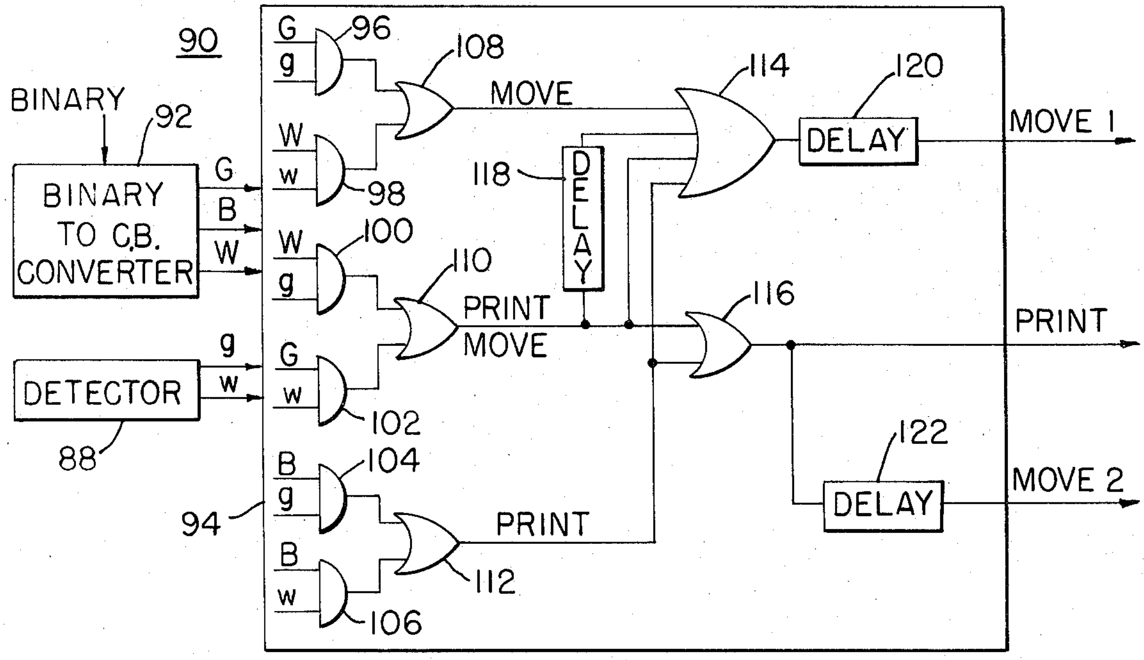
FIG. 6 shows logic circuitry for deriving the control signals for the printer shown in FIG. 5.

Referring now to FIG. 6, the logic 90 for providing the MOVE2, MOVE2 and PRINT signals referred to in FIG. 5, is shown. Logic 90 is responsive to a binary signal which manifests desired information, which, in turn, is to be manifested by the color bar code. The binary signal is provided to a binary to color bar converter 92 which provides one of a G, B or W signal respectively indicating that a green, black or white color is to be printed. Each binary value will cause one of the G, B, or W signals to become logic "1." An example of a binary to color bar converter 92 is shown by the above mentioned Girard patent application; Ser. No. 51,075, or the Graham patent application, Ser. No. 51,149. It should be noted that a logic "1" W signal may not be specifically provided, but may be indicated by a logic "0" for both the G and B signals. As previously mentioned, detector 88 provides the *g* and *w* signals, with a logic "1" *g* signal indicating that a green prerecorded bar is aligned with print station 86 and a logic "1" w signal indicating that a white prerecorded bar is aligned with the print station 86. Again it should be noted that only a single signal from the detector 88 may be provided, with the other one of the signals being indicated by the complement of the provided signal.

Logic circuit 90 includes a gating circuit 94, which includes six AND gates 96, 98, 100, 102, 104 and 106 and three OR gates 108, 110 and 112. AND gate 96 is responsive to the G and *g* signal and AND gate 98 is responsive to the W and w signals. The outputs of AND gates 96 and 98 are applied as the two inputs of OR gate 108 and the output of OR gate 108 is the "move" signal which indicates that a move with no printing is to occur for the preprinted bar then aligned with print station 86. This of course occurs when a green color is to be in a preprinted green space, or a white color is to be in a preprinted white space, and correspond to the first rule of printing given above.

AND gate 100 is responsive to the W and *g* signals and gate 102 is responsive to the G and *w* signals. The output of AND gates 100 and 102 are applied to the two inputs of OR gate 110. The output of OR gate 110 is the "print-move" signal which indicates that a print and medium move followed by a second medium move is to occur to thereby align the next alternate bar with print station 86. This occurs for the second half of a double width black bar followed by a preprinted bar of the desired color, such as bars 38 and 40, or bars 52 and 54, in FIG. 4. This corresponds to the third rule of printing given above.

AND gate 104 is responsive to the B and g signals and AND gate 106 is responsive to B and w signals. The outputs of AND gates 104 and 106 are coupled to the two inputs of OR gate 112. The output of OR gate 112 is the "print" signal which indicates that a black bar is to be printed and then the medium is to be moved so that the next adjacent bar is aligned with print station 86. This corresponds to the second rule of printing given above.

In addition, gating circuit 94 includes a four input OR gate 114 and a two input OR gate 116, a delay circuit 118, a delay circuit 120 and a delay circuit 122. The outputs of each of OR gates 108, 110 and 112 are coupled to three of the inputs to OR gate 114. In addition, the output of OR gate 110 is coupled through delay circuit 118 to the fourth input of OR gate 114. The output of OR gate 114 is coupled through delay circuit 120 to become the MOVE1 signal. The outputs of OR gates 110 and 112 are coupled to the two inputs of OR gate 116 and the output of gate 116 is the PRINT signal. The output of OR gate 116 is also coupled through delay circuit 122 to become the MOVE2 signal. The amount of delay provided by delay circuits 120 and 122 is merely enough to allow print station 86 to cause the printing, after which time the medium and ribbon moving begins. In the case of delay circuit 118, the delay must be at least the time required to move the medium one complete bar width.

The logic circuitry used in gating means 94 is illustrative only. It should be noted that many other logic combinations may be used. For instance, gates 104, 106 and 112 may be eliminated and the B signal becomes the "print" signal. Also AND gates 100, 102 and 110 may become a two input NAND gate with the "print" and "move" signals being applied to the two inputs thereof. Further, the delay circuits may be replaced by answer back logic.

It should also be noted that the width of the black bar printed by printing station 86 may be made slightly wider than the bar being overprinted to insure proper color alignments on the tag. In this event, the ribbon would be moved at least the distance of the black bar width.

What is claimed is:

1. In combination a. a record medium having prerecorded adjacent and alternating first and second characteristically different indicia thereon:

b. a recorder responsive to a binary signal for recording on said medium a transition code manifesting said binary code, said transition code including first, second and third characteristically different indicia where transitions from first to second, from second to third and from third to first indicium represent one binary value and transitions from third to second, from second to first and from first to third indicium represent a second binary value, said recorder comprising:

c. single means positioned adjacent said record medium for recording, during a recording operation, said third characteristically different indicium over each of one or the other of said prerecorded first and second characteristically different indicium on said record medium in response to the occurrence of a record signal, said means for recording being aligned with said medium so that an entire one of said prerecorded first and second indicium is overrecorded with said third indicium upon the occurrence of said record signal;

d. means sensing the prerecorded indicia on said record medium for providing a first indicium signal indicating said first prerecorded indicium is aligned with said means for recording and a second indicium signal indicating said second prerecorded indicium is aligned with said means for recording; e. means for moving said medium in response to a move signal, said medium being moved the amount necessary to align the next adjacent prerecorded indicium with said means for printing; and control means responsive to said binary signal and said first and second indicium signals to provide a first move signal to align, with the recording means, the next adjacent first prerecorded indicium which is to be overrecorded with said third indicium in accordance with said transition code, a second move signal to align the next adjacent second prerecorded indicium which is to be overrecorded with said third indicium in accordance with said transition code and a record signal to operate said recording means to record said third indicium over one of said first and second prerecorded indicium.

2. The invention according to claim 1:

wherein said moving means moves said medium in a given direction;

wherein each of said prerecorded indicia has a given width along a line parallel to said given direction; and wherein said moving means moves said medium an amount equal to said given width upon the occurrence of each move signal.

3. The invention according to claim 2 wherein said control means includes a binary code to indicia transition code converter means responsive to said binary code for providing a signal indicating the sequence of said first, second and third indicia which manifest said binary code, and further includes gating means responsive to said converter means signal and said first and second prerecorded indicium signal for providing said record and said move signals.

4. The invention according to claim 3:

wherein a first portion of said gating means provides one of three signals for each binary value to be recorded, said three signals respectively indicating whether only a move signal is to be provided, whether a record signal followed by a move signal is to be provided or whether a record signal followed by two move signals is to be provided; and wherein a second portion of said logic means responds to the provided one of said three signals to provide said indicated record and move signals.

5. In combination, a. a record medium having preprinted thereon a plurality of adjacent bars of first and second colors in such a manner that the first and second color bars alternate;

b. a color bar printer responsive to a binary signal for printing on said record medium a bar transition code manifesting said binary signal in which each bar is one of three colors, each of said bars of said transition code being adjacent to one another along a given direction, the colors of said bars being arranged so that transitions from a first to a second color, from said second to a third color, or from said third to said first color represent a first binary value, and transitions from said third to said second color, from said second to said first color and from said first to said third color represent a second binary value, said printer comprising:

c. a single printing station for printing a bar of said third color on said record medium in response to a print signal applied thereto, said printing station being aligned with respect to said medium so that said third color is printed entirely over a given one or the other of said preprinted first or second color bars;

d. detector means mounted adjacent said printing station for sensing on said medium said first and second color bars to provide a first color signal indicating said printing station is then aligned with a preprinted bar of said first color and a second color signal indicating said printing station is then aligned with a bar of said second color;

e. means for moving said record medium in response to a move signal an amount necessary to align said printing station with the preprinted bar of said medium adjacent to said given preprinted bar; and f. logic means responsive to said binary signal and said first and second color signals to provide a first move signal to align, with said printing station, the next adjacent first preprinted color bar which is to be overrecorded with said third color bar in accordance with said transition code, a second move signal to align, with said printing station, the next adjacent second preprinted color bar which is to be overrecorded with said third color bar in accordance with said transition code, and to provide said print signal.

6. The invention according to claim 5:

wherein said moving means moves said medium in a given direction;

wherein each of said prerecorded color bars has a given width along a line parallel to said given direction; and wherein said moving means moves said medium an amount equal to said given width upon the occurrence of each move signal.

7. The invention according to claim 6 wherein said printing station includes an inked transfer ribbon having ink of said third color on at least one side thereof, with said ink side being adjacent to said medium and print hammer means which in response to said print signal causes said ribbon to contact said medium at said given preprinted bar whereby the ink on said ribbon is transferred to said given preprinted bar.

8. The invention according to claim 7:

wherein said printing station includes means to move said ribbon at least the distance of said given width upon command of a ribbon move signal; and wherein said logic means provides said ribbon move signal after each print signal.

9. The invention according to claim 8:

wherein said logic means includes a binary to color bar converter means responsive to said binary signal for providing a signal indicating the sequence of said first, second and third colors which manifest said binary code; and wherein said logic means further includes gating means responsive to said converter means signal and said medium color signal for providing said print signal, said first and second move signals and said ribbon move signal.

10. The invention according to claim 9 wherein said gating means includes a function decoding portion and a signal providing portion, said function decoding portion providing one of three operating signals each time a preprinted bar becomes aligned with said printing station, a first operating signal indicating that only a first and second move signal is to be provided, a second operating signal indicating that a print signal, a ribbon move signal and one first and second move signal are to be provided, and a third operating signal indicating that a print signal, a ribbon move signal and two successive first and second move signals are to be provided, and said signal providing portion responding to said signal provided by said function decoding portion by providing the indicated print, first and second move and ribbon move signals.

11. The invention according to claim 10:

wherein said first one of said operating signals is provided whenever said medium color signal and the signal from said binary to color bar code converter means indicate the same color;

wherein said second one of said three operating signals is provided whenever said third color is to be printed; and wherein said third one of said three operating signals is provided whenever said binary to code converter means signal indicates one of said first or second colors is to be printed and said medium color signal indicates said printing station is aligned with a bar of the other one of said first and second colors.

* * * * *